Figure 1:
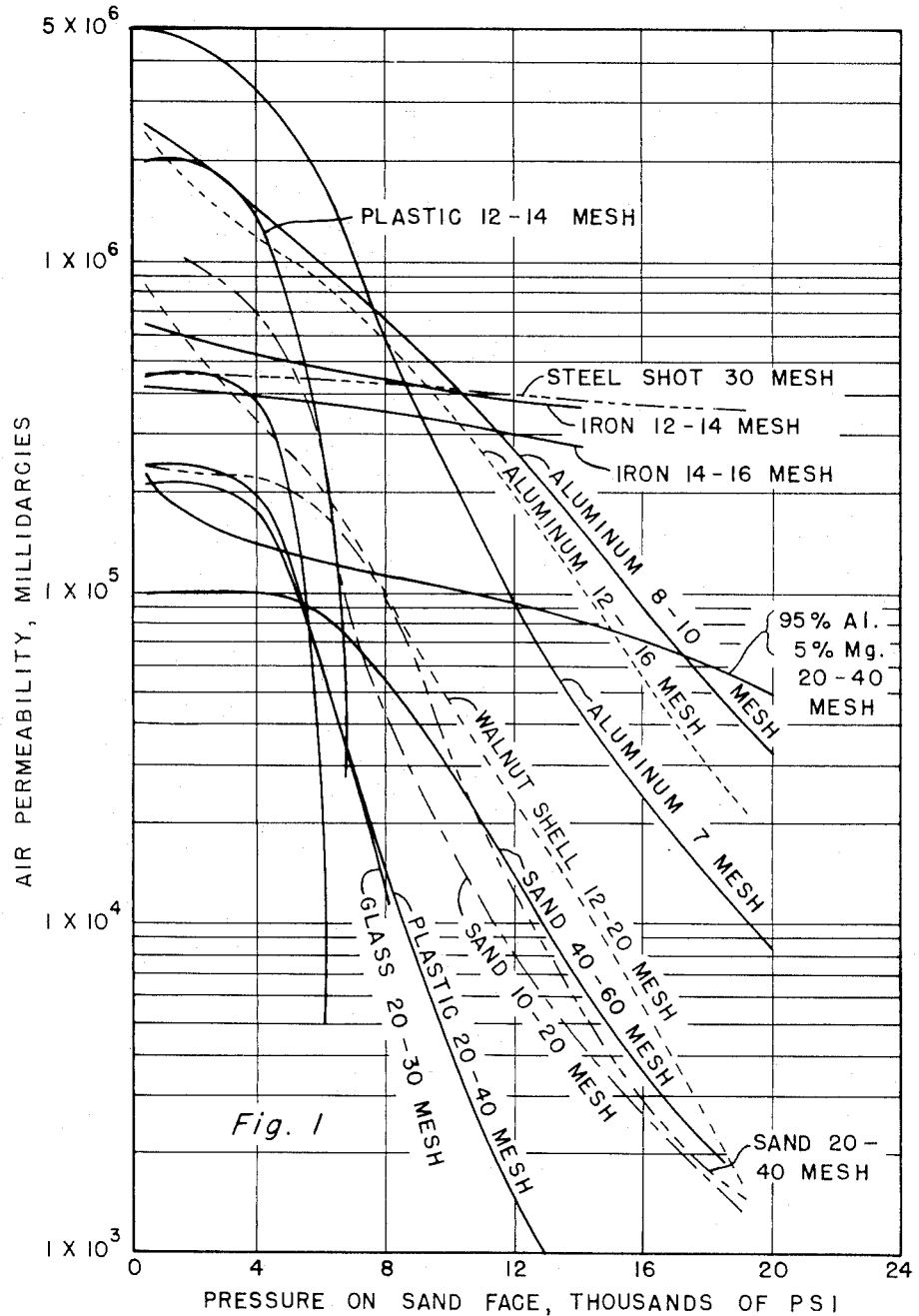

United States Patent Office 3,242,988
Patented Mar. 29, 1966

3,242,988
INCREASING PERMEABILITY OF DEEP
SUBSURFACE FORMATIONS
William J. McGuire, Jr., College Station, Loyd R. Kern,
Irving, and Henry F. Dunlap, Dallas, Tex., assignors to
The Atlantic Refining Company, Philadelphia, Pa., a
corporation of Pennsylvania
Filed May 18, 1964, Ser. No. 368,170
20 Claims. (Cl. 166—42)

The present application is a continuation-in-part of application Serial No. 51,119, filed August 22, 1960, now abandoned, by the inventors of the present application.

The present invention relates to an improved method and composition for increasing the permeability of fluids of subsurface earth formations. In a more particular aspect, the present invention relates to an improved composition and method for propping fractures in subsurface formations to thereby improve the ease with which fluids may be produced from such formations or the ease with which fluids may be injected into such formations.

It is now a well-known fact, particularly in the art of petroleum production, that the permeability of subsurface earth formations can be increased if existing fractures in the formation are propped open with a solid, particle-form propping agent or fractures are created in such formation and similarly propped. In those instances in which fractures do not exist naturally and have not been created by previous operations, fractures are created in the formation of interest by disposing a fluid, such as water, crude oil, kerosene, gelled water, gelled crude oil, gelled kerosene or emulsions opposite such formation and applying sufficient pressure to the fluid to crack the formation and form fractures therein. Such existing or created fractures can be made highly permeable channels for the flow of fluids by depositing in the fractures solid, particle-form materials which serve to hold the walls of the fracture apart. This propping is usually accomplished by pumping into the fractures a liquid containing the solid propping agent. Leakoff of the carrier liquid through the walls of the fracture during pumping or subsequent removal of the liquid by low pressure back flow then leaves the propping agent deposited between the fracture walls. In the vast majority of commercial fracturing operations, it has heretofore been the practice to employ small-sized sand as a propping agent. Although the size of such sands has been varied to some extent in order to obtain improved results, conventional operations have employed sands below 20 mesh or about 0.03 inch in diameter.

In accordance with Patent No. 2,950,247, which issued to William J. McGuire, Jr. and Loyd R. Kern on August 23, 1960, it was disclosed that greatly improved permeability could be obtained in subsurface formations by propping existing or created fractures with large-sized, manufactured formable materials. Specifically, manufactured formable materials, having diameters in excess of 0.03 inch and capable of supporting loads above 40 pounds per particle without fragmentation were found highly effective for propping fractures in subsurface earth formations. It was found that those materials of the class disclosed which had a tendency to deform slightly when a load is applied thereto were substantially superior to materials exhibiting no appreciable deformation under load. This is true since the former, through deformation, present a larger bearing surface and thus reduce the tendency of the particles to embed in the walls of the formation being propped. These materials were also found to increase in strength on deformation due to what may be termed work hardening under the conditions of use. These advantages of materials, such as aluminum, which flatten under load were found to be particularly significant when the propping agent was used in a concentration such that a single layer or less than a single layer of propping agent is deposited in the fracture. However, under certain conditions these members of the general class of manufactured, formable materials which flatten under load are little better than conventional sand. Such conditions are encountered in deep formations where the fracture walls impose high pressures on the propping agent. In addition such deep formations are also comparatively hot and this creates a serious problem in the proper deposition of propping agents in the fracture.

It is, therefore, an object of the present invention to provide an improved method and composition for increasing the permeability to fluids of subsurface earth formations.

Another object of the present invention is to provide an improved method and composition for propping fractures in subsurface earth formations.

Still another object of the present invention is to provide an improved method and composition for propping fractures in deep subsurface earth formations in which the fracture walls impose high pressures on the propping agent.

These and other objects of the present invention will be apparent from the following detailed description when read in conjunction with the drawings, wherein:

FIGURE 1 is a plot comparing the permeability of packed beds of various propping agents under simulated fracture wall pressures which are encountered in the propping of fractures in subsurface formations.

In accordance with the present invention, it has been found that fractures in deep subsurface formations can be suitably propped and high permeability flow channels produced by depositing in the fracture a multi-layer pack of those members of the general class of manufactured, formable materials which do not deform appreciably under load. Although such resistance to deformation can be expressed in a number of ways in other arts, in the fracturing art it can best be expressed in terms of the decrease in permeability of a pack of the material when a load is applied since this is a measure of the effectiveness of the material in actual use.

Briefly, it has been found that substantially improved permeability to fluids can be attained in deep subsurface formations by propping existing or created fractures in such formations with a solid pack of manufactured, formable materials characterized by having a strength such that the air permeability of a solid pack of such material will not decrease more than fifty-fold when the pressure on such pack is increased from 0 to 20,000 p.s.i. It has further been found that a solid pack of such materials can preferably be attained by pumping the propping agent into the fracture in a carrier fluid in which the proppant settles at a rate greater than about 0.1 foot per minute.

The term "solid multi-layer" pack when used in this application refers to a tightly packed mass of discrete particles filling at least a portion of an open fracture in a subsurface formation. This designation is in contrast to what has been termed a "single layer," which means a blanket of particles resting side by side in a fracture with each of the particles in contact with its neighboring particles but in which the thickness of the blanket and, hence the maximum width the fracture is held open by the particles is the diameter of a single particle. Further distinguished from this term is the term "less than a single layer" which means a blanket of particles deposited as in the single layer situation but in which the particles are spaced from one another or are "sparsely" distributed in a single layer.

As previously indicated, prior to the invention of the parent application, it had been conventional practice in the hydraulic fracturing art to deposit in existing or created features sand of various sizes between about 10 and 60 mesh, with the vast majority of operations involving the use of 20 to 40 mesh sand. While other propping agents aside from sand had been mentioned as equivalents of sand, as a practical matter sand was used exclusively as a propping agent in actual operations and work in connection with the present invention proved that no such equivalency existed. It was found in accordance with the parent application that substantially improved permeability could be obtained in fracturing operations by depositing in the fracture a manufactured, formable material having a particle size in excess of 0.03 inch and capable of supporting loads in excess of about 40 pounds per particle without fragmentation. Because of the high strength of these materials and their ability to support loads far in excess of that of conventional sand, it was found that substantially improved permeability could be attained when these materials were used. In addition, the property of certain of these materials, which will flatten when a load is applied rather than break into fragments as does sand, made these materials highly desirable since the flattening of the material caused the propping agent to present a larger bearing area for the walls of the fracture and thus permitted the use of such materials in a single layer rather than a solid multi-layer pack and in most cases in a sparse population such that large void spaces were left between individual particles in a single layer.

Although the use of materials such as aluminum, which deform and flatten under load, produced results which were unexpectedly superior to the results obtained with sand, it has now been found that the very advantage which was responsible for this improvement at moderately high fracture wall pressures and moderately great depths make these materials little better than sand at extremely high pressures or in deep formations.

Reference to FIGURE 1 will show the distinct and unexpected advantages which can be attained in accordance with the present invention. FIGURE 1 is a plot of the air permeability of various materials deposited in a multi-layer pack 1 inch thick, 1½ inches wide and 2 inches long when such a pack is subjected to increasing pressures.

One method of measuring permeability is as follows:

A high pressure cell is formed of a rectangular steel box having inner dimensions of 1½ inches wide and 2 inches long and a steel block adapted to slide into the box and form the top thereof. Screened air taps, designed to prevent channeling, are positioned on opposite sides of the cell in open communication with the interior thereof. Two additional taps are positioned adjacent the air taps to measure pressure differential across the cell.

The test is carried out by placing a sheet of Teflon on the bottom of the box and filling the box with the desired propping material to a height of 1 inch. A second Teflon sheet is placed on top of the body of material and the steel closure block is inserted. Air is thereafter forced through the cell at a convenient rate via the air taps as the indicated compressive force is applied to the body of material by means of the closure block. Measurements of the rate of air flow and the differential pressure are made during the test. Based on these measurements and the dimensions of the propping material pack the permeabilities of the pack are calculated by conventional well-known formulas. Other conventional permeability tests produce similar results.

It is to be seen from FIGURE 1 that various sizes of sand lose permeability rapidly when pressures in excess of about 4,000 p.s.i. are applied to the sand pack. Even though at zero load the larger sized sand has a high permeability, the permeability decreases rapidly as load is applied in excess of about 4,000 pounds and above 6,000 pounds all such sands irrespective of size result in substantially the same permeability and all are extremely poor. The sharp breaks in the permeability curves for the various sands is due to the fact that at pressures in the neighborhood of about 4,000 p.s.i., the sand particles begin to break into fragments and even though all of the particles are not crushed, the small fragments formed tend to fill the void spaces between the unbroken larger particles and ultimately a large-sized sand which had a high permeability at no load ends up with a permeability which is as bad as or worse than that of a much smaller-sized sand. As far as the extremely small-sized sands are concerned, although the overall decrease in permeability is not as great, there is a sharp decrease in the permeability curve when the sand begins to crush. Thus, it may be seen that irrespective of the particle size of sand, glass or similar materials which break into fragments under load, none of these materials are suitable for use when the walls of a fracture apply pressures in excess of about 6,000 p.s.i.

Further reference to FIGURE 1 shows that aluminum pellets, certain plastics and crushed and rounded walnut shell also decrease rapidly in permeability at pressures in excess of about 6,000 p.s.i. Although such materials do not break into fragments as does sand, these materials deform and pack together very tightly under pressure, thus resulting in poor permeabilities at the high pressures illustrated.

In contrast, steel pellets, iron and aluminum alloys show no such decrease in permeability. Thus, it is obvious that at pressures above about 6,000 p.s.i., materials such as steel shot which retain their shape and do not flatten or crush into fragments are vastly superior to the other materials tested. Of particular significance is the fact that such materials retain substantially the same permeability at pressures up to 15,000 and even as high as 20,000 p.s.i. The lower limit of 6,000 p.s.i. represents minimum formation depths of about 6,666 to 15,000 feet since the pressure exerted by the walls of a fracture, when expressed in p.s.i., ranges from about 0.4 to 0.9 times the depth of the formation in feet.

It is also to be observed from the comparison of sand, which breaks into fragments, and aluminum and walnut shell, which deform but do not break into fragments, with steel shot, which neither breaks into fragments nor deforms, that the measurement of permeability of a bed of the material under pressure is a measure of both resistance to fragmentation and resistance to deformation.

Under the above pressure conditions, it has also been found that solid, multi-layer packs of the propping agent must be employed. If a single layer or less than a single layer of the propping agent is used, the propping agent tends to embed in the walls of the fracture, and the fracture will close almost completely. The deposition of a multi-layer pack of the propping agent of the present invention imposes two additional requirements. First, a relatively small-sized material should be used. Normally, the width of a fracture does not exceed about 0.2 inch. Accordingly, if the diameter of the propping agent is greater than about one-half such width, the absolute maximum concentration that one can obtain is a two-layer pack of the propping agent. This, of course, is not satisfactory since embedment in the formation will not be avoided. Accordingly, as a practical matter, the propping agent in accordance with the present invention should be less than about 0.1 inch in diameter.

It has also been found that the deposition of a multi-layer pack of propping agent is best achieved by suspending the propping agent in a carrier in which the settling rate is comparatively rapid. As a practical matter, it has been found that this settling rate should be at least about 0.1 foot per minute. Under these conditions, the propping agent will settle in the fracture near the well bore and thus be deposited in the fracture where a high permeability is needed most. This requirement of rapid settling also solves another major problem in fracturing deep formations since the temperatures encountered cause considerable difficulty. Under high temperatures, the vast majority of commercially available propping agent carriers lose their carrying capacity rapidly. However, when operating in accordance with the present invention, this does not present a serious problem since rapid settling is desired and in some cases plain water or salt water may be employed as a carrier.

Suitable propping agents in accordance with the present invention include steel, iron, certain alloys, such as alloys of aluminum and magnesium, etc. Each of these materials exhibits the characteristic of retaining its original shape when subjected to the highest pressures which are encountered in fracturing operations, and at a minimum their permeability does not decrease more than tenfold when a solid, multi-layer pack is subjected to increasing pressures from 0 to 15,000 p.s.i. and not more than fifty-fold from 0 to 20,000 p.s.i. In fact, such materials exhibit substantially this same characteristic of not decreasing in permeability more than fifty-fold over a pressure range of 6,000 to 20,000 p.s.i.

Since, as stated previously, the propping agent should be deposited in the fracture near the borehole in order to obtain the best results and since the propping agents of the present invention are comparatively more expensive than materials such as sand, a quantity of sand or other comparatively inexpensive material may be deposited in the fracture prior to the deposition of propping agent in accordance with the present invention. In addition, once a propping agent has been deposited in accordance with the present invention, the operator should avoid the practice of overflushing. The practice of overflushing has been rather prevalent in the fracturing art and consists of following the deposition of propping agent with a quantity of liquid, either the same as the carrier or differing therefrom, for the purpose of being sure that all the propping agent is forced into the fracture. This practice, however, has been found to be a disadvantage where high permeability fractures are to be obtained, as in the practice of the present invention, since the propping agent is washed down the channel and away from the well bore where it is needed most.

Obviously, when one utilizes materials such as steel and iron shot and suspends these materials in a carrier fluid in which they settle at a rapid rate, as indicated above, the rate at which the carrier fluid is pumped into the fracture is also an important factor which contributes to the deposition of a solid multi-layer pack of propping agent in the fracture. Accordingly, it has also been found in accordance with the present invention that the propping agent suspended in the carrier should be pumped into the fracture at a rate above about 7 barrels per minute. At this rate the particles will not settle into the well bore and thus fail to enter the fracture, and the pressure of the carrier fluid will tend to pack the propping agent in the fracture. It should also be recognized that an overflush of fluid containing no propping agent should follow the last volume of propping agent in order to deposit a solid multi-layer pack. This, of course, is based upon the previous observation that fluid injected at a high rate and in sufficient volume will tend to pack the propping agent into a solid pack in the fracture.

The following examples illustrate the advantages of utilizing the composition and technique of the present application and in particular the advantages of utilizing iron shot in accordance with the disclosed technique.

A formation located between 8,700 and 8,900 feet below the surface was fractured in the following manner.

40,000 gallons of lease crude containing $1/20$ pound per gallon of leakoff agent was injected at a rate of 18 barrels per minute. This was followed with 20,000 gallons of lease crude containing the leakoff control agent and 20,000 pounds of 20–40 mesh sand at a rate of 18 barrels per minute. A separator slug of heavy oil in the amount of 5,000 gallons was pumped in at the rate of 15 barrels per minute. Thereafter, 20,000 gallons of heavy oil containing 100,000 pounds of 14–18 mesh iron shot was pumped in at a rate of from 7 to 10 barrels per minute. Another 35,000 pounds of 20–40 mesh sand was suspended in 12,000 gallons of oil and pumped in at 9 barrels per minute. This was followed with an overflush of 101 barrels of lease crude at 9 barrels per minute. Prior to the fracture treatment this well produced less than 200 barrels of oil per day. Shortly after the fracture treatment the well was producing 350 barrels of oil per day, and after more than a year, 270 barrels per day. In addition, two wells in this same producing formation had previously been fractured utilizing aluminum pellets without any noticeable or clearly defined increase in production.

Another formation located between 6,270 and 6,300 feet was treated as follows:

The formation was acidized with 20,000 gallons of conventional acid. Thereafter 10,000 pounds of 20–40 mesh sand was suspended in 7,000 gallons of oil and pumped in at a rate of 15.3 to 18.4 barrels per minute. 15,000 pounds of 14–18 mesh iron was then suspended in 3,200 gallons of oil and pumped in at 15.4 barrels per minute and overflush of 70 barrels of lease crude was then utilized. Prior to the fracture treatment the well produced 17 barrels of oil per day, and after the production rate had generally settled the well produced 75 barrels of oil per day. Refracturing operations in this same formation utilizing sand as a propping agent had not generally resulted in noticeable increases in production.

Still another treatment in a formation around 8,800 feet below the surface consisted of the injection of 10,000 pounds of sand at 1.25 pounds per gallon of carrier, followed by 50,000 pounds of 14–18 mesh iron at 3.8 pounds per gallon of carrier. The sand was injected at a rate of 18 barrels per minute and the iron at 13 barrels per minute. Production prior to the treatment was 110 barrels per day. After production had reached a substantially steady rate, 280 barrels per day were produced, and after a year 178 barrels per day were produced.

Another well at a depth of about 8,800 feet was treated with 29,000 pounds of sand in a concentration of 2.4 pounds per gallon, 60,000 pounds of iron shot in a concentration of 5 pounds per gallon, and finally, 6,000 pounds of sand at 3 pounds per gallon. The injection rates were 8.5, 9 and 7 respectively. This particular well produced 155 barrels of oil per day prior to treatment. This leveled out at about 280 barrels per day, which rate has been maintained for about ten months.

Still other wells were fractured at depths of about 8,000 feet and propped in a similar manner with 20–40 mesh sand followed by 16–20 mesh iron. The injection rates employed were between 10 and 12 barrels per minute and the concentration of iron in its carrier was above about $3\frac{1}{2}$ pounds per gallon. In one case production increased from 90 to 205 barrels per day and in the other case from 45 to 319 barrels per day. While these wells have not produced more than several months, the rates given are considered to be steady set rates after production of the fracturing fluids.

The above sand operations clearly indicate the distinct advantages which can be obtained by use of the propping agent of the present application when injected in a manner to deposit a multi-layer pack of such material in a fracture. In all cases, as indicated, propping the fractures with sand or aluminum had proven inadequate in previous trials, or was not expected to be of any significant value.

We claim:

1. In a method for increasing the permeability to fluids of a subsurface earth formation having at least one fracture extending from the wall of a well bore radially into said formation and wherein the walls of said fracture exert a pressure in excess of 6,000 p.s.i., the improvement comprising suspending in a fluid carrier a manufactured, formable material selected from the group consisting of metallic, ceramic and plastic particles of generally spherical shape and mixtures thereof, said particles having a permeability to air which decreases less than fifty-fold when the pressure on a solid multi-layer pack of said particles is increased from 0 to 20,000 p.s.i., a settling rate in said fluid carrier greater than 0.1 foot per minute and a particle size less than 0.1 inch in diameter, and pumping said suspension into said fracture at a rate of at least about 7 barrels per minute.

2. A method in accordance with claim 1 wherein the steps set forth are preceded by the step of pumping a quantity of sand suspended in a fluid carrier into the fracture at a rate in excess of 7 barrels per minute.

3. A method in accordance with claim 1 wherein the steps set forth are followed by the steps of pumping a liquid free of particle-form solid materials in the fracture.

4. A method in accordance with claim 1 wherein the particles are present in the fluid carrier in a concentration greater than 3 pounds per gallon of carrier.

5. A method in accordance with claim 4 wherein the manufactured, formable material comprises metallic particles.

6. A method in accordance with claim 5 wherein the metallic particles are steel particles.

7. A method in accordance with claim 5 wherein the particles are iron particles.

8. A method in accordance with claim 5 wherein the metallic particles are aluminum alloy particles.

9. A method in accordance with claim 8 wherein the aluminum alloy particles are an aluminum-magnesium alloy.

10. A method in accordance with claim 1 wherein the manufactured, formable material comprises metallic particles.

11. A method in accordance with claim 10 wherein the metallic particles are steel particles.

12. A method in accordance with claim 10 wherein the metallic particles are aluminum alloy particles.

13. A method in accordance with claim 12 wherein the alloy particles are an aluminum-magnesium alloy.

14. A method in accordance with claim 10 wherein the particles are iron particles.

15. In a method for increasing the permeability to fluids of a subsurface earth formation having at least one fracture extending from the wall of a well bore radially into said formation and wherein the walls of said fracture exert a pressure in excess of 6,000 p.s.i. the improvement comprising forcing into said fracture a fluid suspension of a manufactured, formable material selected from the group consisting of metallic, ceramic and plastic particles of generally spherical shape and mixtures thereof, said particles having a resistance to fragmentation and a resistance to deformation such that the air permeability of a solid, multi-layer pack of said particles decreases less than fifty-fold when the pressure on said pack is increased from 6,000 to 20,000 p.s.i., said particles having a settling rate at least as great as 0.1 foot per minute in said fluid suspension.

16. A method in accordance with claim 15 wherein the manufactured, formable material comprises metallic particles.

17. A method in accordance with claim 16 wherein the metallic particles are iron particles.

18. A method in accordance with claim 16 wherein the metallic particles are steel particles.

19. A method in accordance with claim 16 wherein the metallic particles are aluminum alloy particles.

20. A method in accordance with claim 19 wherein the alloy particles are an aluminum-magnesium alloy.

References Cited by the Examiner

UNITED STATES PATENTS

| | | | |
|---|---|---|---|
| 2,667,224 | 1/1954 | Howard | 252—8.55 |
| 2,754,910 | 7/1956 | Derrick. | |
| 2,802,531 | 8/1957 | Cardwell | 252—8.55 |
| 2,859,819 | 11/1958 | Trott | 252—8.55 |
| 2,950,247 | 8/1960 | McGuire et al. | 252—8.55 |
| 2,962,095 | 11/1960 | Morse | 166—42.1 X |
| 3,024,191 | 3/1962 | Jones | 166—42.1 X |
| 3,075,581 | 1/1963 | Kern | 166—42.1 |
| 3,121,464 | 2/1964 | Huitt et al. | 166—42.1 |
| 3,127,937 | 4/1964 | McGuire et al. | 166—42.1 |

OTHER REFERENCES

Perkins, et al.: How to Design Aluminum Pellet Fracturing Jobs, In World Oil, May 1961, pages 94–101.

CHARLES E. O'CONNELL, *Primary Examiner.*

D. H. BROWN, *Assistant Examiner.*